United States Patent Office 2,874,141
Patented Feb. 17, 1959

2,874,141

UNSATURATED POLYESTER-VINYL MONOMER COMPOSITION STABILIZED WITH 3,6-DI-N-PROPYLCATECHOL AND METHOD OF PREPARATION

Roger M. Christenson, Richland Township, Chester L. Parris, Pittsburgh, and Earl E. Parker, Allison Park, Pa., assignors to Pittsburgh Plate Glass Company No Drawing. Application April 19, 1956
Serial No. 579,147

9 Claims. (Cl. 260—45.4)

This invention relates to a novel dihydric phenol compound and to use of the same and it has particular relation to a novel dialkyl catechol and the use of the same as a gelation inhibitor in interpolymerizable mixtures of (A) monomers comprising $>C=CH_2$ groups and (B) polyesters of alpha-beta ethylenic dicarboxylic acids and, dihydric alcohol.

The preparation of liquid interpolymerizable mixtures of (A) monomers containing the group $>C=CH_2$ and being represented by styrene and (B) polyesters of dihydric alcohols and alpha-beta ethylenically unsaturated dicarboxylic acids (or mixtures of the foregoing acids and non-ethylenic dicarboxylic acids) has been heretofore disclosed.

A strong tendency to interpolymerize to form thermoset resins constitutes a characteristic of these mixtures and in the presence of peroxidic catalysts of addition reaction, they can be quickly interpolymerized at moderate temperatures and with little or no pressure, to a hard, thermoset state. This rapid interpolymerization at the appropriate curing stage is highly advantageous. However, unfortunately, such tendency is not limited to said stage, but it also occurs even during the preliminary stages of mixing the monomer and the polyester and in the subsequent stages of storage, both before and after the incorporation of the peroxidic catalyst. In these earlier stages, the tendency to interpolymerize is often highly objectionable, since it can quickly convert a liquid mixture which can be poured, cast or spread or permeated into fibrous masses and fabrics, into a gelled or solid state in which it cannot be satisfactorily handled in many procedures.

In order to reduce this tendency of the mixture to gel prematurely, it has heretofore been common practice to incorporate into the mixture, small amounts of substances termed gelation inhibitors. Among the substances suggested as gelation inhibitors in the mixtures, are included such phenols containing a plurality of hydroxyls as hydroquinone. The latter material is inexpensive and is a strong inhibitor, but is seriously objectionable in many applications, inasmuch as it tends to discolor the resin products obtained from the mixture into which it is introduced. It also often excessively reduces the rate of ultimate cure. Furthermore, it is affected in its inhibitory characteristics by some pigments, e. g. carbon black, so that when the mixture containing it is employed in coating or impregnating sheets and laminates of fibers containing such pigment as a coloring agent, the portions of the resin overlaying, or contiguous to any portions of the fibers containing the pigment have different curing rates than those portions containing no pigments, or lesser amounts of pigments. In those portions where the interpolymers are used on sheets and laminates containing colored designs formed by the pigments, surface irregularities, called ghosting effects, may thus be produced corresponding in outline to the design.

Other phenols containing a plurality of hydroxyls and containing branched hydrocarbon chains and being represented by tertiary butyl catechol, have also been employed as gelation inhibitors in the foregoing interpolymerizable mixtures, but have not been entirely satisfactory, inasmuch as they also are affected by carbon black, wherever the resin comes in contact with the latter, to produce ghosting effects.

This invention comprises the discovery of 3,6-di-n-propylcatechol which is a novel compound per se. It also comprises further discovery that this compound, even in very small amounts in an interpolymerizable mixture of (A) a monomer containing a $>C=CH_2$ group and (B) a polyester of a dihydric alcohol and an alpha-beta ethylenic dicarboxylic acid, is a superior gelation inhibitor. Curing of the mixture which is protected against premature gelation by 3,6-di-n-propylcatechol is not substantially affected adversely by pigments, notably carbon black, or at least, is not affected to as great a degree as the conventional materials containing previously recognized phenolic compounds such as hydroquinone or tertiary butyl catechol as inhibitors. Therefore, when mixtures containing the 3,6-di-n-propylcatechol as a gelation inhibitor are used to impregnate or to coat substrates containing said pigments, ghosting effects are reduced or substantially eliminated.

It is further found that the interpolymerizable mixtures containing the novel inhibitor exhibit exceptionally good tank life. That is, a mixture of a monomer containing the group $>C=CH_2$ and a polyester of an alpha-beta ethylenic dicarboxylic acid and a dihydric alcohol will withstand aging without gelation for a considerable period of time even after the peroxidic catalyst, such as benzoyl peroxide, has been added. This is desirable, inasmuch as it admits of catalyzing larger batches of material with an appropriate peroxidic agent and using the mixture before undue tendency of the mixture to set up or gel is encountered. However, when the mixture is heated to normal curing temperatures, it will quickly cure and set to a hard, thermoset state without appreciable discoloration.

Various methods may be employed in forming the diallyl ether of catechol suitable for rearrangement to form diallyl catechol which subsequently is hydrogenated to form 3,6-di-n-propylcatechol. However, one such method comprises reacting an allyl halide with catechol in the presence of a solvent. Allyl bromide operates efficiently with acetone as a solvent. Allyl chloride which is less expensive operates very efficiently in highly polar solvents. Dimethyl formamide constitutes an example of such highly polar solvent. Others of similar characteristics may also be employed in like capacity.

The technique is illustrated by the following example:

EXAMPLE A

A flask is employed as a reaction vessel. The charge comprises:

Dimethyl formamide _____milliliters__ 300
Potassium carbonate _____grams__ 152
Catechol _____do____ 52

The flask is flushed with carbon dioxide and the mixture is agitated and heated to 90° C., at which point slow introduction of 89 grams of allyl chloride is started. The introduction is effected below the surface of the charge. The temperature rises to about 125° C. and is kept at that value until the addition of allyl chloride is complete, which requires about 1½ hours. The mixture is maintained at the reaction temperature for about 24 hours. The contents of the flask are then cooled, filtered and distilled. The product is diallyl ether of catechol suitable for rearranging and hydrogenating to provide 3,6-di-n-propylcatechol.

The preparation of the diallyl ether of catechol is further illustrated by the following example:

EXAMPLE B

In this example, a five liter, three-necked flask is fitted with a stirrer, an efficient condenser and a dropping funnel. The flask is charged with 277 grams (2.5 moles) of catechol, 760 grams (5.5 moles) of anhydrous potassium carbonate, and 1,500 milliliters of anhydrous acetone. The mixture in the flask is refluxed with agitation while 667 grams (5.5 moles) of allyl bromide is added dropwise from the funnel. The addition is completed in 45 minutes and the mixture is then refluxed for 21 hours, additional acetone being added at intervals to maintain mobility of the mixture. The mixture in the flask is then cooled, the solids are separated and washed thoroughly with solvent (e. g. acetone), and the filtrate obtained is concentrated through a column at atmospheric pressure. A yield of 436–449 grams of a crude product having an index of refraction ($n_d^{24}$) of 1.5284 to 1.5293 has thus been obtained. This crude product has been found to have a hydroxyl number of 21.4 to 28.9. This product, when distilled under vacuum, has been found to have a hydroxyl number of 15.5 and an iodine value of 281.8 and comprises essentially the diallyl ether of catechol.

As an alternative procedure, the reaction product obtained by refluxing the catechol and the allyl bromide may be purified by diluting it with water and extracting the solution exhaustively with ether. Subsequently, the ether solution is washed with 5 percent sodium hydroxide solution until a colorless aqueous layer is obtained. The solution is then dried and distilled. In this way, a light yellow residue has been obtained. The latter, upon distillation, has yielded 442 grams of a colorless oil. The oil has a boiling point of 85° C. to 87° C. at 0.1 millimeter of mercury (absolute pressure). The oil has a refractive index ($n_d^{24}$) of 1.5284. The hydroxyl value is 14.4, the iodine number is 275.7.

For purposes of rearranging or isomerizing the diallyl ether of catechol to obtain 3,6-diallylcatechol, a 250 milliliter, three-necked flask is equipped with a condenser, a stirrer, a gas inlet tube and a thermometer. The flask is charged with 100 grams (0.527 mole) of the purified diallyl ether of catechol having a refractive index ($n_d^{24}$) of 1.5291. The compound is then heated at 160° C. to 170° C. with stirring under an atmosphere of inert gas, e. g. carbon dioxide or nitrogen. After 2¾ hours of heating, a refractive index of 1.5539 is obtained and this does not increase with continued heating. The product, when vacuum distilled, affords a distillate which in a specific example has been obtained in a yield of 87.6 grams of colorless oil boiling in a range of 99° C. to 109° C., under a pressure (absolute) of 0.05 millimeter of mercury. This product has a refractive index of 1.5522. The product is purified diallyl catechol suitable for subsequent hydrogenation to form 3,6-di-n-propylcatechol.

As an alternative procedure, the diallyl ether of catechol may be rearranged as follows:

A mixture of 100 grams (0.527 mole) of the purified diallyl ether of catechol is introduced into the 250 milliliter flask above described along with 30 grams of xylene and 1 gram of anhydrous potassium carbonate. The mixture is refluxed under an inert atmosphere (carbon dioxide or nitrogen) at 174° C. to 179° C. for a period of about 2¾ hours. During this time the refractive index ($n_d^{24}$) has been found to change from 1.5174 to 1.5360. Further refluxing does not produce substantial change in the refractive index. Accordingly, it may be assumed that the rearrangement or isomerization of the catechol diallyl ether is substantially complete. The solvent (xylol) is then distilled off to give a residue which has a weight of 84.5 grams and is a colorless oil boiling at 121° C. to 127° C. under a pressure of 0.6 millimeter (absolute) of mercury. This oil has been found to have a refractive index ($n_d^{24}$) of 1.5512. The hydroxyl number of the product is 517.5.

The hydrogenation of the diallyl catechol prepared by the techniques previously described will now be described. A charge of diallyl catechol is dissolved in high grade methyl alcohol and 0.5–1.0 percent by weight of palladized carbon is added.

The mixture is then shaken in a bomb and hydrogen under a pressure of 20 to 60 pounds per square inch is passed in for a period of about 1.5 to 2 hours for each half gram mole of compound. The hydrogenated product is removed from the bomb and the mixture containing the reaction product is passed through a Celite filter bed to remove the catalyst. The filtrate is concentrated by distillation under vacuum, and then fractionated. The distillation chart is as follows:

*Fractionation of 3,6-di-n-propylcatechol*

| B. p., °/C. | Pressure, mm. | Weight | Percent charge | OH | Remarks |
|---|---|---|---|---|---|
| 112–124 | 0.5 | 11.8 | 5.9 | | Semi solid. |
| 112–121 | 0.2–0.35 | 92.6 | 46.3 | 571.4 | Solid. |
| 130–138 | 1.0–1.5 | 26.6 | 13.3 | 544 | Oil. |
| 106–228 | 0.3 | 30.0 | 15.0 | 386.6 | Oil. |
| Pot bottoms | | 21.0 | 10.5 | | |
| Holdup, losses, etc. | | 18 | 9.0 | | |

The second fraction, which is a solid and has a boiling point of 112° C. to 121° C. under a pressure of 0.20 to 0.35 millimeter of mercury (absolute), is the purified product and apparently consists essentially of the desired 3,6-di-n-propylcatechol of this invention.

The 3,6-di-n-propylcatechol as thus obtained is well adapted for use as a gelation inhibiting agent in liquid mixtures of monomers containing >C=CH$_2$ groups and polyesters of dihydric alcohols and alpha-beta ethylenic dicarboxylic acids.

The invention also includes other uses as for example the following:

As an anti-skinning agent in paints and varnishes which are subject to skin-formation in closed containers during storage. For example, a small amount (0.001 to 1 pound) of 3,6-di-n-propylcatechol may be introduced into 100 gallons of a paint or varnish containing tung oil and siccatives or driers in order to obtain desired resistance to skin-formation during storage in a container.

As a germicide, the sodium salt of the 3,6-di-n-propylcatechol may be dissolved in water to provide a solution to be used to kill or suppress bacteria.

The use of 3,6-di-n-propylcatechol for general application as a gelation inhibitor in interpolymerizable mixtures of monomers and polyesters of dihydric alcohols and alpha-beta ethylenically unsaturated dicarboxylic acids is contemplated. The monomers prior to the curing stage are usually liquids and are adapted to act as liquid diluents of the polyesters. They contain a >C=CH$_2$ group attached to a negative radical such as a benzene ring, a halogen atom or a carboxylic acid radical. Usually, they are inherently polymerizable to form homopolymers, but form interpolymers with polyesters much more rapidly. Many such monomers and many such polyesters are disclosed in Patents 2,593,787 and 2,676,947 to Earl E. Parker. The monomers comprise such compounds as:

Styrene
α-Methyl styrene
p-Methyl styrene
Divinyl benzene

Unsaturated esters such as:

Vinyl acetate
Methyl methacrylate
Methyl acrylate
Allyl acetate
Diallyl phthalate
Diallyl succinate
Diallyl adipate
Diallyl sebacate
Diethylene glycol bis(allyl carbonate)
Triallyl phosphate
Esters such as those of monohydric or polyhydric alcohols (methyl, ethyl, propyl, allyl, methallyl, vinyl) and an unsaturated polymerizable monocarboxylic acid (acrylic, methacrylic, chloroacrylic)
Other esters of monohydric unsaturated alcohols (allyl, vinyl, methallyl, 2-chloroallyl, crotyl) and mono- or polycarboxylic acids (acetic, propionic, succinic, etc.)
Esters of alpha-beta unsaturated dicarboxylic acids (maleic, fumaric, itaconic) and monohydric alcohols (methyl, ethyl, propyl, isopropyl, amyl)

and many others.

The polyesters include as dihydric alcohol components such compounds as:

Ethylene glycol
    Diethylene glycol
    Triethylene glycol
    Polyethylene glycol
    1,3-trimethylene glycol
    1,2-propylene glycol
    Dipropylene glycol
    Butylene glycol
    Styrene glycol and mixtures of two or more of the same.

The polyesters include as ethylenically unsaturated dicarboxylic acid components such acids as:

Maleic acid
    Fumaric acid
    Aconitic acid
    Mesaconic acid
    Citraconic acid
    Ethyl maleic acid
    Pyrocinchoninic acid
    Xeronic acid
    Itaconic acid and others and mixtures thereof.

In many instances, it is desirable to replace a part of the ethylenically unsaturated acid with a non-ethylenically unsaturated acid. The term "non-ethylenically unsaturated acid" includes such acids as contain benzene rings and being represented by phthalic acid and the isomers thereof. In the benzene ring, the double bonds, in so far as interpolymerization is concerned, do not react. The acids include those containing aliphatic hydrocarbon groups connecting the carboxyls and being represented by adipic acid, but it is intended to exclude any acids containing triple or acetylenic bonds or other unsaturation which might impart functionality to the second acid component other than that of the carboxyls. The following are a few of the acids of the latter group:

Phthalic acid
    Isophthalic acid
    Terephthalic acid
    Tetrachlorophthalic acid
    Succinic acid
    Adipic acid
    Suberic acid
    Azelaic acid
    Dimethyl succinic acid the latter type of acids, if employed, may be in a ratio from about 0.25 to 12 moles per mole of the alpha-beta ethylenic dicarboxylic acid.

It is to be recognized that the term "dicarboxylic acid" includes the anhydride of the acid (where the latter exists). This applies to all types of the dicarboxylic acids. In many instances, the anhydrides are more satisfactory for the formation of polyesters than are the free acids from which they are derived and in any event the polyesters obtained are the same.

The various commutations and permutations of the dihydric alcohols listed above with the various ethylenically unsaturated acids are included within the scope of the invention. The various ethylenically unsaturated dicarboxylic acids may also be mixed with the various possible acids free of functioning unsaturation to provide the various possible mixed polyesters.

The following constitute some of the possible polyesters which are included within the scope of the present invention as being suitable for mixing with $>C=CH_2$ monomers and being stabilized with 3,6-di-n-propylcatechol in accordance with the provisions of this invention. Polyesters of:

Ethylene glycol and fumaric acid
Ethylene glycol and maleic acid
Ethylene glycol and itaconic acid
Propylene glycol and fumaric acid
Propylene glycol and maleic acid
Propylene glycol and itaconic acid
Diethylene glycol and fumaric acid
Diethylene glycol and maleic acid
Diethylene glycol and itaconic acid Mixed polyesters comprising 1 mole of ethylenically unsaturated dicarboxylic acid and 0.25 to 12 moles of nonethylenic acid:

Propylene glycol with fumaric acid and phthalic acid
Propylene glycol with maleic acid and phthalic acid
Propylene glycol with itaconic acid and phthalic acid
Propylene glycol with fumaric acid and adipic acid
Diethylene glycol with fumaric acid and phthalic acid
Diethylene glycol with maleic acid and phthalic acid
Diethylene glycol with itaconic acid and phthalic acid
Diethylene glycol with fumaric acid and adipic acid
Diethylene glycol with maleic acid and adipic acid
Diethylene glycol with itaconic acid and adipic acid The monomers as disclosed may be employed with the polyesters in ratios varying approximately from 10 to 50 percent by weight based upon the total mixture. The 3,6-di-n-propylcatechol may be employed in a ratio of about 0.001 to 0.1 percent by weight based upon the total mixture.

This mixture conveniently is prepared by incorporating the inhibitor into the styrene or into the polyester as a preliminary operation. The 3,6-di-n-propylcatechol may also be cooked into the polyester if so desired during the operation of forming the same. The polyester and the styrene may be mixed while sufficiently warm to assure adequate fluidity of the polyester provided the 3,6-di-n-propylcatechol is present in one of the components. The mixture may be cooled and may be stored at room temperature over relatively long periods of time without danger of premature gelation.

When the stabilized mixture is to be cured, it may be incorporated with an appropriate catalyst of interpolymerization, preferably one of the peroxidic type such as:

Benzoyl peroxide
    Tertiary butyl hydroperoxide
    Cyclohexyl hydroperoxide
    Acetyl peroxide
    Lauroyl peroxide and others. These catalysts may be employed in amounts within a ratio of about 0.01 to about 5 percent by weight based upon the mixture.

The following example illustrates the use of 3,6-di-n-propylcatechol as a gelation inhibitor in an interpolymerizable mixture of a monomer containing a >C=CH$_2$ group and a polyester of an alpha-beta ethylenic dicarboxylic acid:

EXAMPLE I

The polyester was of the following composition:

| | Moles |
|---|---|
| Maleic acid | 9 |
| Phthalic acid | 11 |
| Propylene glycol | 22 |

The polyester was mixed with monomer (styrene) and inhibitor to provide the following composition:

| | Parts by weight |
|---|---|
| Polyester | 600 |
| Styrene | 250 |
| Inhibitor | 0.09 |

The inhibitor in each instance was incorporated with the styrene before the latter was mixed with the polyester.

For purposes of comparison, a series of sets of samples, each of the foregoing composition, were prepared. One set was stabilized with hydroquinone; a second set was stabilized with tertiary butyl catechol and a third set was stabilized with 3,6-di-n-propylcatechol. The styrene containing the inhibitor was added to the polyester while the latter was liquid and at about 120° C.

The samples were subjected to a liquid peak exotherm (L. P. E.) test which comprised adding 1 percent by weight of benzoyl peroxide, introducing a portion of the sample into a test tube of about 16 millimeters' diameter and inserting a thermocouple into the center. The tube was then placed in a water bath at 180° F. The time, in minutes, required for the sample to rise from 150° F. to the maximum attained was taken as the L. P. E. value and is a criterion of the rate of cure of the sample. This test was conducted upon freshly prepared samples and also upon samples that had been stored for 24 hours.

Tank life was determined by storing a sample of the catalyzed mixture of 100° F. until gelation occurred. This period is the tank life.

The results of the tests are tabulated as follows:

| Inhibitor (0.09 gram) | Hydroquinone | t-Butyl catechol | 3,6-di-n-propylcatechol |
|---|---|---|---|
| L. P. E. value (fresh sample) | 5.9 | 5.1 | 6.5 |
| L. P. E. value (after 24 hrs.) | 7.1 | 5.4 | 6.2 |
| Tank life (hours) | 20 | 7-11 | 22 |

The samples, at the curing temperatures, quickly harden to thermoset, clear castings which can be further hardened by baking at about 250° F. It will be observed that the tank life of the sample containing 3,6-di-n-propylcatechol is superior to that of the other samples and the rate of cure is very good. Most important, however, it will be observed that the L. P. E. value of the mixture containing 3,6-di-n-propylcatechol, after storage for 24 hours, is somewhat shorter than is that of the freshly prepared samples. This is in contrast to the other samples, in which the L. P. E. values all drifted upwardly. The downward drift of 3,6-di-n-propylcatechol is important if the mixture is to be used to coat or otherwise to treat surfaces which contain pigments such as carbon black which tend to change the curing characteristics of the resin. It has been found that where the mixture contains an inhibitor, such as hydroquinone or tertiary butyl catechol whose L. P. E. value drifts upwardly upon storage, serious difficulty with surface irregularities may attend the use of the mixture over designs printed in an ink containing such pigments. If the mixture contains 3,6-di-n-propylcatechol as an inhibitor, these difficulties are reduced or eliminated.

The 3,6-di-n-propylcatechol also provides a good inhibitor of gelation during storage of the mixture, but before the catalyst is added. The mixture can be stored safely for weeks or months. The mixture, when the catalyst is added, can be cured quickly at temperatures of about 75° C. to 250° C. to provide sound, thermoset resins. The mixture may be used in the coating or impregnation of paper, fiber glass asbestos, cotton or other materials. The mixture may also be used in forming castings and other bodies.

The samples in the following example provide a simple comparison, such as is obtained by eye, illustrating the superior uniformity of surface of coatings of interpolymerizable mixtures containing 3,6-di-n-propylcatechol as an inhibitor, in a film upon a paper laminate having a design in a carbon black-containing ink imprinted thereupon.

EXAMPLE II

The 3,6-di-n-propylcatechol in this example was compared with hydroquinone, a conventional gelation inhibitor in such mixtures, and again with 3-isopropylcatechol which is an improved inhibitor, the use of which is a recent discovery. The latter compound is substantially superior to most of the conventional inhibitors, such as hydroquinone and tertiary butyl catechol heretofore employed, and the comparison of the 3,6-di-n-propylcatechol with this material constitutes a stringent test.

In the tests, the base laminate comprised sheets of porous, absorbent paper which were suitably bonded together. The surface sheet comprised a thin, tough sheet of relatively impermeable paper having alternate stripes in black and white. The black stripes were understood to be of an ink containing carbon black.

In the test, the imprinted sheet was first impregnated with the polyester-monomer mixture in a soaking operation, the sheet was applied to the backing laminate of porous paper and was then further coated with a layer of polyester-monomer mixture containing the gelation inhibitor under comparison.

SAMPLE 1

The polyester of this example comprised propylene glycol esterified wth a mixture of equal moles of maleic anhydride and phthalic anhydride. The interpolymerizable mixture comprised:

| | Percent by weight |
|---|---|
| Polyester | 75. |
| Styrene | 25. |
| Hydroquinone | 0.03 (based upon the polyester component). |
| Benzoyl peroxide | 1 (based upon the mixture). |

SAMPLE 2

In this sample, the polyester component comprised the propylene glycol polyester of a mixture of 9 moles of maleic anhydride and 11 moles of phthalic anhydride. The polyester was made up into an interpolymerizable mixture comprising:

| | Percent by weight |
|---|---|
| Polyester | 70. |
| Styrene | 30. |
| 3-isopropylcatechol | 0.015 (based upon the polyester). |
| Benzoyl peroxide | 1 (based upon the mixture). |

SAMPLE 3

This sample was the same as Sample 2, except that the 3-isopropylcatechol was replaced by an equal amount of 3,6-di-n-propylcatechol.

For purposes of curing the samples, the latter were placed in an oven and baked at a temperature of 200° F. for a period of 15 minutes.

The samples were all well cured. However, it was observed that the surfaces of those samples containing the 3,6-di-n-propylcatechol as a gelation inhibitor appeared to be optically smooth and uniform. On the other hand, the surfaces of those samples which contained the hydroquinone or the 3-isopropylcatechol were definitely optically non-uniform being characterized by effects as of depressions over those portions of the paper which were covered with the black ink and by an appearance as of elevations over those portions overlying the white. These irregularities are often definitely objectionable in a commercial product.

The forms of the invention as previously given are to be considered as being by way of illustration. It will be apparent to those skilled in the art that numerous modifications may be made therein without departure from the spirit of the invention or the scope of the appended claims.

We claim:

1. A method of inhibiting premature gelation in an interpolymerizable mixture of a monomer containing a $>C=CH_2$ group and a polyester of a dihydric alcohol and an alpha-beta ethylenic dicarboxylic acid, which comprises incorporating into the mixture 3,6-di-n-propylcatechol, the monomer in said mixture being about 10 to about 50 percent by weight of the total mixture and the 3,6-di-n-propyl catechol being about 0.001 to about 0.1 percent by weight of the mixture the polyester being substantially the rest of the mixture.

2. As a new composition of matter a mixture which comprises (A) a monomer containing a $>C=CH_2$ group, (B) a polyester of a dihydric alcohol and an alpha-beta ethylenic dicarboxylic acid, (C) 3,6-di-n-propylcatechol, the monomer in said mixture being about 10 to about 50 percent by weight of the total mixture and the 3,6-di-n-propyl catechol being about 0.001 to about 0.1 percent by weight of the mixture the polyester being substantially the rest of the mixture.

3. In a method of imparting to a mixture which comprises (A) a monomer containing a $>C=CH_2$ group and (B) a polyester of a dihydric alcohol and an alpha-beta ethylenic dicarboxylic acid, good resistance to premature gelation during storage and to ghosting effects during curing in the presence of carbon black; the step of incorporating into the mixture 3,6-di-n-propylcatechol, the monomer in said mixture being about 10 to about 50 percent by weight of the total mixture and the 3,6-di-n-propyl catechol being about 0.001 to about 0.1 percent by weight of the mixture the polyester being substantially the rest of the mixture.

4. In a method of inhibiting premature gelation in an interpolymerizable mixture of a monomer containing a $>C=CH_2$ group and a polyester of a dihydric alcohol and a mixture of dicarboxylic acids, one of which is alpha-beta ethylenic and another of which is free of ethylenic and acetylenic unsaturation, the step of incorporating into the mixture 3,6-di-n-propylcatechol; the second-mentioned dicarboxylic acid being employed in an amount of about 0.25 to about 12 moles per mole of the first-mentioned dicarboxylic acid; the monomer being employed in an amount of about 10 to 50 percent by weight of the total mixture, the 3,6-di-n-propyl catechol being employed in an amount of about 0.001 to about 0.1 percent by weight of the total mixture and the polyester being substantially the rest of the mixture.

5. In a method of inhibiting premature gelation in an interpolymerizable mixture of styrene and a polyester of a dihydric alcohol and a mixture of dicarboxylic acids, one of which is alpha-beta ethylenic and another of which is free of ethylenic and acetylenic unsaturation, the step of incorporating into the mixture 3,6-di-n-propylcatechol; the second-mentioned dicarboxylic acid being employed in a molar ratio of about 0.25 to about 12 moles per mole of the first-mentioned dicarboxylic acid, the styrene being employed in an amount of about 10 to about 50 percent by weight of the total mixture, the 3,6-di-n-propyl catechol being employed in an amount of about 0.001 to about 0.1 percent by weight of the total mixture and the polyester being substantially the rest of the mixture.

6. In a method of inhibiting premature gelation of an interpolymerizable mixture of styrene and a mixed polyester of a dihydric alcohol and a mixture of maleic acid and phthalic acid, the step of incorporating 3,6-di-n-propylcatechol into the mixture; the phthalic acid being employed in a molar ratio of about 0.25 mole to about 12 moles per mole of maleic acid, the styrene being employed in an amount of about 10 to about 50 percent by weight based upon the total mixture, the 3,6-di-n-propyl catechol being employed in an amount of about 0.001 to about 0.1 percent by weight of the total mixture and the polyester being substantially the rest of the mixture.

7. As a new composition of matter an interpolymerizable mixture of a monomer containing a $>C=CH_2$ group and a mixed polyester of a dihydric alcohol and a mixture of an alpha-beta ethylenic dicarboxylic acid and a dicarboxylic acid which is free of ethylenic and acetylenic unsaturation, said mixture being stabilized against premature gelation by means of 3,6-di-n-propylcatechol; the second-mentioned dicarboxylic acid being employed in an amount of about 0.25 to about 12 moles per mole of the first-mentioned dicarboxylic acid; the monomer being employed in an amount of about 10 to 50 percent by weight of the total mixture, the 3,6-di-n-propyl catechol being employed in an amount of about 0.001 to about 0.1 percent by weight of the total mixture and the polyester being substantially the rest of the mixture.

8. As a new composition of matter an interpolymerizable mixture of styrene and a mixed polyester of a dihydric alcohol and a mixture of an alpha-beta ethylenic dicarboxylic acid and a dicarboxylic acid which is free of ethylenic and acetylenic unsaturation, said mixture being stabilized against premature gelation by means of 3,6-di-n-propylcatechol; the second-mentioned dicarboxylic acid being employed in a molar ratio of about 0.25 to about 12 moles per mole of a first-mentioned dicarboxylic acid, the styrene being employed in an amount of about 10 to about 50 percent by weight of the total mixture, the 3,6-di-n-propyl catechol being employed in an amount of about 0.001 to about 0.1 percent by weight of the total mixture and the polyester being substantially the rest of the mixture.

9. As a new composition of matter, a mixture of styrene and a mixed polyester of a dihydric alcohol and a mixture of phthalic acid and maleic acid, and the mixture being stabilized against premature gelation by means of 3,6-di-n-propylcatechol; the phthalic acid being employed in a molar ratio of about 0.25 to about 12 moles per mole of the maleic acid, the styrene being employed in an amount of about 10 to about 50 percent by weight of the total mixture, the 3,6-di-n-propyl catechol being employed in an amount of about 0.001 percent to about 0.1 percent by weight based on the total mixture and the polyester being substantially the rest of the mixture.

References Cited in the file of this patent

UNITED STATES PATENTS

| | | |
|---|---|---|
| 2,181,102 | Stoesser et al. | Nov. 21, 1939 |
| 2,439,421 | Erickson | Apr. 13, 1948 |
| 2,642,410 | Hoppens | June 16, 1953 |
| 2,676,947 | Parker | Apr. 27, 1954 |
| 2,698,312 | Parker | Dec. 28, 1954 |
| 2,722,556 | Young et al. | Nov. 1, 1955 |

OTHER REFERENCES

Chemical Abstracts, vol. 44 (1950), page 9359.
Chemical Abstracts, vol. 40 (1946), page 1789.
"The Merck Index," 6th edition, 1952, page 810 relied on.